United States Patent [19]

Blanpied et al.

[11] Patent Number: 5,294,647

[45] Date of Patent: *Mar. 15, 1994

[54] METHOD OF PRODUCING RIGID FOAMS AND PRODUCTS PRODUCED THEREFROM

[75] Inventors: Robert H. Blanpied; Robert J. Butkus; Andy I. McLaughlin; Richard L. Donald, all of Meridian, Miss.

[73] Assignee: Atlas Roofing Corporation, Meridian, Miss.

[*] Notice: The portion of the term of this patent subsequent to Oct. 12, 2010 has been disclaimed.

[21] Appl. No.: 18,304

[22] Filed: Feb. 16, 1993

Related U.S. Application Data

[63] Continuation-in-part of Ser. No. 720,735, Jun. 25, 1991, and a continuation-in-part of Ser. No. 851,889, Mar. 16, 1992.

[51] Int. Cl.$^5$ .............................................. C08J 9/14
[52] U.S. Cl. ................... 521/125; 521/129; 521/130; 521/131; 521/170; 521/902
[58] Field of Search ............... 521/129, 130, 131, 125, 521/170, 902

[56] References Cited

U.S. PATENT DOCUMENTS

| | | | |
|---|---|---|---|
| 3,993,609 | 11/1976 | Kamens et al. | 521/138 |
| 4,485,196 | 11/1984 | Speranza et al. | 521/172 |
| 4,572,865 | 2/1986 | Gluck et al. | 428/309.9 |
| 4,636,529 | 1/1987 | Crooker | 521/917 |
| 4,710,521 | 12/1987 | Soukup et al. | 521/118 |
| 4,714,717 | 12/1987 | Londrigan et al. | 521/131 |
| 4,898,893 | 2/1990 | Ashida | 521/131 |
| 4,927,863 | 5/1990 | Bartlett et al. | 521/131 |
| 4,960,804 | 10/1990 | Doerge | 521/130 |
| 4,981,879 | 1/1991 | Snider | 521/131 |
| 4,981,880 | 1/1991 | Lehman et al. | 521/902 |
| 5,032,623 | 7/1991 | Keske et al. | 521/131 |
| 5,091,436 | 2/1992 | Frisch et al. | 521/137 |

OTHER PUBLICATIONS

N. Malwitz, P. A. Manis, S.-W. Wong and K. C. Frisch, "Amine Catalysis of Polyurethane Foams"–Annual Polyurethane Conference–Oct. 15-17-1986-pp. 338-353.

Primary Examiner—Morton Foelak
Attorney, Agent, or Firm—Nixon & Vanderhye

[57] ABSTRACT

In a method of producing a thermosetting foam, a first of two foam forming blends ("A-Blend") is prepared using a multi-functional isocyanate such as polymeric polymethylene polyphenylisocyanate ("PMDI"). A second of two foam forming blends ("B-Blend") is prepared by mixing together a polyol; water; a tertiary amine catalyst having at least two hydrogen bonding sites for one molecule; and, an alkali metal organo-salt catalyst. The tertiary amine catalyst is of a type wherein both the hydrogen segment and the hydroxyl segment of water are attracted by both of the hydrogen bonding cites on the catalyst molecule essentially simultaneously. A first blowing agent is included with one of the two foam forming blends. When the first and second foam forming blends are mixed together, the tertiary amine catalyst quickly initiates a reaction predominately of the polymeric polymethylene polyphenylisocyanate with water (as opposed to a reaction with the polyol). The quick reaction of the PMDI with water causes, prior to a gel point of the foam, both (1) the production of a second blowing agent for forming cells in the blends and for causing expansion in the liquid blends; and (2) sufficient exothermic heat to initiate boiling of the first blowing agent. Relatively large amounts of alkali metal organo-salt catalyst induce rapid vaporizing of the first blowing agent due to a high level of exothermic heat, whereby expansion of the mixed blends is substantially completed prior to the effective conversion of the mixed liquid blends to a solid. According to the method, a degree of completion of expansion of the foam at any point in time exceeds a degree of completion of chemical reactions of the foam. In another mode of the invention, a frothing agent is also employed.

20 Claims, 5 Drawing Sheets

METHOD OF PRODUCING RIGID FOAMS AND PRODUCTS PRODUCED THEREFROM

CROSS REFERENCE TO RELATED APPLICATIONS

This application is a continuation-in-part of U.S. patent application Ser. No. 07/720,735 filed Jun. 25, 1991; and a continuation-in-part of U.S. patent application Ser. No. 07/851,889 filed Mar. 16, 1992; all of which are incorporated herein by reference.

BACKGROUND

1. Field of the Invention

This invention pertains to methods of producing rigid foams and the foams made thereby, particularly polyurethane modified polyisocyanurate foams used for thermal insulation.

2. Prior Art and Other Considerations

Cellular organic plastic foams made with urethane linkages, or made with a combination of both isocyanurate linkages and urethane linkages, are well known in the art. These foams have been made from the catalyzed reaction between polymeric polymethylene polyphenylisocyanate (a.k.a. Polymeric Methylene Di-Isocyanate, or "PMDI") and polyols of various physical and chemical properties. As used herein, the term "PMDI" defines any polymeric MDI which has an average functionality greater than 2.0. The PMDI has been used either alone, or in a blend with a blowing agent and (optionally) with a capped silicone surfactant. Such a blend utilizing PMDI has traditionally been called the "A-Blend".

In order to form good cell size, good cell distribution, and cell-wall construction, it has sometimes been preferred to add other "plastic foam cell modifiers" to the foam formulations. Often, it has been preferred to add these other agents to the polyol mixture. These foam cell modifiers include, but are not limited to: propylene carbonate, dispersing agents, organic surfactants, predominantly silicone surfactants, nucleating agents, fire retardants, and expansion agents. This blend, including the polyol(s), expansion agent(s), and catalyst(s), has been called the "B-Blend".

As used herein, the term "expansion agents" includes blowing agents and frothing agents. Moreover, as used herein, a blowing agent is a substance which is either produced or becomes a gas subsequent to the first of several chemical reactions. Many blowing agents have boiling points in the range from about 10° C. to about 50° C. On the other hand, $CO_2$ is considered a blowing agent since, although it has a boiling point outside this range, it is produced by an isocyanate reaction. A frothing agent is a substance which is a liquid under sufficient pressure, then when released from pressurized containment, accordingly produces gas-filled cells in foam prior to the initial chemical reaction. Many frothing agents have boiling points falling in the range of about −52° C. to 10° C.

It has been considered important to keep the viscosity of each mixed blend about equal to the other blend. The rule of thumb has been to keep both the A-Blend and the B-Blend equal in the range of 250 cps to 1500 cps, with the chemical blends at about 60° F. to about 70° F. just prior to mixing. (All viscosities herein are "centipoise" taken on a Brookfield viscometer.)

Prior art insulation thermosetting foams have been primarily "blown" or expanded, by the use of CFC-11, (trichloromonofluoromethane). Some minor use of CFC-12 has also been used, as explained below. Due to environmental considerations, both CFC-11 and CFC-12 have fallen into disfavor. Most commercial foam producers have historically formulated all of their foam formulae around CFC-11 properties. These properties of CFC-11 affecting the foam formulae include the boiling point, the solubility parameters, the number of molecules per unit weight, the latent heat at boiling point, and the rate of membrane permeability of CFC-11.

Likewise, it is important to successful production of foam to have the many complex chemical reactions of the thermosetting polymerization timed with the rate of foam expansion. The dynamics of this problem, along with workable solutions, are taught in U.S. patent application Ser. No. 07/720,735 filed Jun. 25, 1991, and incorporated herein by reference. U.S. patent application Ser. No. 07/720,735 teaches the need for an ethylene linkage in the tertiary amine between two heteroatoms. However, it has since been discovered that another class of tertiary amines have reasonably good hydrogen bonding sites for water, and they will work nearly as well at promoting $CO_2$ expansion in preference to the urethane reaction. This class is described in some detail below.

When CFC-11 and CFC-12 are ultimately replaced by alternate blowing and/or frothing agents, the prior art techniques will not suffice. The new frothing and blowing agents have detrimental properties that interfere with cell formation. This type of expansion agents include hydrochlorofluorocarbons, or partially hydrogenated chlorofluorocarbons, (referenced by the contraction "HCFCs"); plus the non-chlorine containing fluorocarbons, called hydrofluorocarbons, or "HFCs". As referenced herein, "HFCs" includes HFC-Ethers, as well as plain HFCs. All the physical properties mentioned above (including the boiling point, the solubility parameters, the number of molecules per unit weight, the latent heat at boiling point, and the rate of membrane permeability) differ for HCFCs, HFCs, and HFC-Ethers, as opposed to CFC-11 and CFC-12. As has been shown in U.S. patent application Ser. No. 07/720,735 filed Jun. 25, 1991, these physical properties are detrimental to both heat energy utilization and the timing of the reactions with the rate of expansion.

For example, both HCFC-123 and HCFC-141b have higher boiling points than CFC-11. The CFC-11 boils at 74.9° F. (23.8° C.); while HCFC-123 boils at 82.2° F. (27.9° C.), and HCFC-141b boils at 89.6° F. (32.0° C.). The higher boiling point means the start of the expansion of foam requires more heat energy input than prior art methods. Using prior art methods, these two new HCFCs naturally slow down foam expansion. Slow expansion of the foam allows the chemical reactions to create solidification prior to cell expansion, which causes a high foam density, i.e., low insulating properties.

Another detrimental effect of some new expansion agents is the cooling effect caused by the partial evaporation of low boiling point products. For example, monochlorodifluoromethane, $CHClF_2$, or HCFC-22, boils at −41.4° F.(−40.8° C.). Some of the product added will evaporate as soon as it is released to atmospheric pressure, and thus will cool the polymer mixture. It has been discovered that the cooling effect of an evaporating frothing agent reduces the exothermic heat from the urethane reaction. To a large degree, the exothermic heat from the urethane reaction is the main heat energy source for the trimerization reaction. It is well known that high levels of heat energy are needed to complete the trimerization reaction which causes the PMDI to form into the isocyanurate linkage. A lack of trimerization causes product failures from the loss of dimensional stability and from excess flammability.

U.S. Pat. No. 4,572,865 teaches the production of polyisocyanurate foams suing CFC-12, dichlorodifluoromethane, $CCl_2F_2$, which boils at $-21.6°$ F. ($-29.8°$ C.), as a frothing agent. While U.S. Pat. No. 4,572,865 does not specifically mention the cooling effect of using CFC-12, it is well known that this frothing agent does create evaporative cooling in foam production. Other than possibly using high oven temperatures, U.S. Pat. No. 4,572,865 fails to teach any chemical reaction to make up the loss of exothermic heat which is taken away by the evaporative cooling of the frothing agent, CFC-12.

U.S. Pat. No. 4,636,529 teaches the use of $CHClF_2$ as a means of using more low cost polyester polyol; however, it does not provide for a means to achieve adequate trimerization to create a flame resistant foam.

Likewise, U.S. Pat. No. 4,981,880 to Lehmann teaches the use of water and tertiary amine catalysts as a means of blowing open-celled foam, and it reveals the use of trimerization catalysts in the production of flexible foam. However, it does not use PMDI, nor does it use over 1.0 pphp trimerization catalyst. It furthermore teaches the use of so much water as to rupture cell walls and to accomplish at least 50% of the volumetric expansion with $CO_2$. The instant invention does not contemplate more than 50% expansion via $CO_2$, as a good insulating isocyanurate foam cannot be made with that level of $CO_2$.

The strong solvent action characteristic of two of the new blowing agents is detrimental if used with methods of the prior art. These two agents are HCFC-123 and HCFC-141b, referred to hereinafter as "2-carbon HCFCs". These two agents are much stronger solvents in both Blends as well as the foam, than were the CFC blowing agents of the prior art. If they are used as the primary expansion agent with prior art polyols, the "solvent effect" of these materials will keep the polymer matrix very soft, and severe shrinking of the foam will occur as soon as the cell gas cools and the vapor pressure is reduced. For example, in U.S. Pat. No. 4,927,863 (Bartlett et al), examples are shown in Table III whereby all prior art foams shrink in excess of 33% when these two HCFCs are used in normal foam blowing amounts. U.S. Pat. No. 4,927,863 teaches a simple method of reducing the amount of the 2-carbon blowing agents utilized, by substituting other expansion agents which have less solvent effect on prior art foam. U.S. Pat. No. 4,927,863 fails to teach any new chemical methods whereby either HCFC-123 or HCFC-141b (or both) may be utilized as the sole expansion agent without the foam shrinking excessively.

As stated above, these new agents are much stronger solvents in both B-Blends and A-Blends than were the CFC blowing agents of the prior art. The increased solubility causes dramatic decreases in Blend viscosities. When the viscosity of the foamable blends gets too low, the resulting mixture of A-Blend (primarily PMDI) with B-Blend (primarily polyol) will form cells with walls which are too weak to hold the cell gas, and they will burst. II. any prior art foamable blend system, the viscosity with the 2-carbon blowing agents will get low enough that the resulting mixture will form cells with thin walls and thick intercellular struts. The cell wall becomes thin due to the "drainage" of low viscosity polymer from the wall area to the strut area. This creates a foam which is poor insulation. Very small cell diameters (mirrocellular), with the cells having closed, thick walls and tin struts, all at the proper density, are desired for good insulation properties. To create good cellular walls in the cellular foam matrix, the viscosity of the final foaming mixture must be high enough to keep the cell from bursting, or to restrain drainage from the cell wall into the cellular strut. This is especially important when frothing agents are utilized which expand instantaneously when released from high pressure containment.

U.S. patent application Ser. No. 07/495,616 filed Mar. 19, 1990 (incorporated herein by reference) teaches that use of a high viscosity polyol with a high number average molecular weight is advantageous to forming strong cell walls when used with HCFCs and HFCs. The polyols described therein all have viscosities over 10,000 cps (Brookfield at 75° F.), and some are over 20,000 cps. It shows that these higher viscosity polyols make blends lower in viscosity than prior art low viscosity polyols make with CFC-11.

It has been known for many years that a smaller, finer cell size and a more rounded shape will produce better thermal insulating properties. For example, U.S. Pat. No. 4,981,879 teaches that perfluorocarbons can be used in minor amounts to produce improved .k-factors". For example, it was reported that the cell diameter of foams using perfluorocarbons (fully fluoronated carbon; i.e., a "FC" has no hydrogen) was about half. Now it has been discovered that utilizing the methods of this invention, any small molecule frothing agent such as HCFC-22 produces microcellularization without the need for a perfluorocarbon. No FC is utilized in this invention.

Thus it is seen that prior art formulations and processing conditions must be significantly changed to utilize HCFCs and HFCs. The new problems presented by the new expansion agents are: 1) Excessively low viscosities and shrinking foam caused by the higher solubility of 2-carbon HCFCs; and, 2) A slow-down of foam expansion due to the higher boiling point of 2-carbon HCFCs; and, 3) A cooling effect from the evaporation of low boiling point frothing agents, reducing needed exothermic heat; and, 4) A cell-rupturing effect due to the rapid expansion of frothing agents.

To compensate for these problems, a novel combination of new polymer materials, new catalyst systems, new blowing agent systems, and new processing conditions are presented in the instant invention.

It is therefore an object of the present invention to provide an improved method for the production of a rigid thermosetting plastic foam insulation.

An advantage of the present invention is the provision of an improved method for the production of a rigid thermosetting plastic foam insulation by using polyols and/or isocyanate prepolymers having ambient temperature viscosities so high they have heretofore been considered unacceptable for use in rigid polyisocyanurate foam production.

Another advantage of the present invention is defeating the detrimental effect of utilizing high percentages of the strong-solvent and high boiling point 2-carbon HCFC compounds.

An advantage of the present invention is the provision of a method of utilizing heretofore unacceptably high viscosity Blends by warming said Blends to reduce viscosities to normal at the mix-head.

An advantage of the present invention is the provision of a method which counteracts the cooling effect of evaporating expansion agents.

Another advantage of the present invention is the provision of a method which provides an increased amount of exothermic heat.

It is another advantage of the present invention to provide a method which conveniently maintains the rate of expansion when utilizing higher boiling point blowing agents which hinder this rate.

It is another advantage of the present invention to provide a method whereby a frothing agent having a lower boiling point and a lower molecular weight than used in prior art foams, as well as blowing agents with higher boiling points, can be used together and still maintain the temperatures needed for the completion of the trimerization reaction as well as maintaining the timing of the speed of foam expansion with the speed of chemical reactions.

It is a further advantage of the present invention to provide an improved cell structure, hence improved k-factors, in rigid plastic foam insulation by utilizing smaller organic molecules in solution than previously used as a nucleating agent in the process.

It is a further object of the present invention to provide a slow rate of blowing agent escaping by diffusion from the cells.

Yet another advantage of the present invention is the provision of a method that compensates for the strong solvent action of some HCFCs and HFCs, and still maintains good cell wall formation.

Yet another advantage of the present invention is the provision of a method that compensates for rapid expansion of a frothing agent by maintaining strong cell walls at the early stages of the chemical reactions and thus producing a high percentage of closed-cells and small cells in the foam.

It is still another object of the present invention to provide an improved structural laminated foam board insulation at a cost lower than would be possible without utilizing a frothing agent.

Another advantage of the present invention is the provision of the use of several common blowing agent materials with low costs, offering the designer multiple choices.

A further advantage of the present invention is the provision of a strong, economical, closed cell foam insulation which is characterized by a high degree of fire resistance, a high initial resistance to thermal conductivity, and a high long-term thermal resistance.

SUMMARY

In a method of producing a thermosetting foam, a first of two foam forming blends ("A-Blend") is prepared using a multi-functional isocyanate such as polymeric polymethylene polyphenylisocyanate ("PMDI"). A second of two foam forming blends ("B-Blend") is prepared by mixing together a polyol; water; a tertiary amine catalyst having at least two hydrogen bonding sites for one molecule; and, an alkali metal organo-salt catalyst. The A-Blend and the B-Blend have viscosities in excess of 250 cps and are at temperatures in excess of 75° F. A first b)owing agent is included with at least one of the two foam forming blends.

The tertiary amine catalyst is of a type wherein both the hydrogen segment and the hydroxyl segment of water are attracted by both of the hydrogen bonding cites on the catalyst molecule essentially simultaneously. When the first and second foam forming blends are mixed together, the tertiary amine catalyst quickly initiates a reaction predominately of the polymeric polymethylene polyphenylisocyanate with water (as opposed to a reaction with the polyol). The quick reaction of the PMDI with water causes, prior to a gel point of the foam, both (1) the production of a second blowing agent for forming cells in the blends and for causing expansion in the liquid blends and (2) sufficient exothermic heat to initiate boiling of the first blowing agent. Relatively large amounts of alkali metal organo-salt catalyst induce rapid vaporizing of the first blowing agent due to a high level of exothermic heat, whereby expansion of the mixed blends is substantially completed prior to the effective conversion of the mixed liquid blends to a solid.

The tertiary amine catalyst preferentially causes the water to react with isocyanate to produce $CO_2$, thereby causing a degree of completion of expansion of the foam at any point in time to exceed a degree of completion of chemical reactions of the foam. The tertiary amine catalyst is chosen from a group consisting of dimethylethanolamine; hexahydro-1,3,5-tris(3-dimethylaminopropyl)triazine; 2,4,6-tris(dimethylaminomethyl)-phenol; pentamethyldiethylenetriamine; and, bis(2-dimethylaminoethyl)ether.

The organo-salt catalyst is chosen from a group consisting of potassium 2-ethylhexanoate in glycols; potassium acetate in glycols; potassium acetate as a salt dissolved in water; potassium acetate in water formed in situ by mixing acidic acid with potassium hydroxide; and, a preblending of water, potassium hydroxide, and 2-ethyl hexanoic acid. The amount of organo-salt catalyst mixed in the blend is enough to achieve an exothermic temperature in excess of 275° F. in a 250 gram cup mix.

In one mode of the invention, a frothing agent is included in one of the foam forming blends The high level of exothermic heat obtained by the present invention is sufficient to substantially complete all potential chemical reactions in spite of any cooling caused by any evaporation of the frothing agent.

Thus, a higher exothermic temperature producing reaction is utilized than was used in prior art rigid foam production. The higher energy is utilized by the higher temperature requirements of higher boiling point HCFCs, and optionally, the increased heat energy is absorbed by evaporative cooling.

The utilization of the higher heat energy avoids the scorching problems usually associated with excessive exotherm temperatures, but advantageously assures that the foam properties are not harmed by a lack of energy needed to complete reactions. This heat energy is utilized to assure the completion of the critical trimerization reaction, which in turn assures the flammability resistance and dimensional stability of the rigid polyurethane modified polyisocyanurate foam insulation.

Additionally, the increased heat energy is used to advantage by the higher boiling point blowing agents utilized in the instant invention. These higher boiling points require more heat energy to cause expansion of the rigid foam.

Also, certain B-Blend polyols are advantageously used to compensate for the higher solvent action of a new class of blowing agents described herein; as well as the rapid frothing action from a new class of frothing agents.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

The method of the present invention is used to prepare foams which have isocyanurate linkages in them; i.e., no foams proposed herein have a chemical equivalent ratio of polyisocyanate to polyol of less than 1.5:1.0. The typical polyurethane foams using the normal urethane equivalent ratio of isocyanate to polyol of 1.0:1.0; such as used in refrigerators, coolers, etc.; does not have the need for a high exothermic heat source to promote the trimerization reaction. The flammability codes of building construction foam insulation requires the isocyanurate linkage. While not usually needed in refrigerator type polyurethanes, the polyisocyanurate foam of the present invention is often needed in other types of rigid insulation foam. Thus all foams of the present invention have an equivalent ratio, or "Index", of polyisocynnate to polyol in excess of 1.5:1.0, and most preferably in the range 2.0:1.0 to 5.0:1.0.

The foams of the present invention are made from B-Blends having at least a minor amount of an active hydrogen compound such as water or an organic acid incorporated therein to produce $CO_2$ expansion agent, and also having at least one tertiary amine catalyst, which catalyst quickly produces a high exothermic heat by reaction of isocyanate with the active hydrogen, and also having a relatively large amount of an alkali metal organo-salt catalyst to continue the rapid rise of the exothermic reaction temperature.

In addition to the carbon dioxide ($CO_2$) produced by the reaction of an active hydrogen upon polymeric isocyanate, the other expansion agents of the present foam invention are selected from the group consisting of: 1) Those novel azeotropic blowing agent mixtures as disclosed in U.S. Pat. No. 5,166,182 (which is hereby incorporated herein by reference); and, 2) Those expansion agents known as partially hydrogenated chlorofluorocarbons, or hydrochlorofluorocarbons, and are referenced herein by the contraction "HCFCs"; and, 3) Those expansion agents known as fully hydrogenated fluorocarbons, or hydrofluorocarbons, referenced by the contraction "HFCs" (including HFC-Ethers); and, 4) CFC-11.

Some, but not all, foams of the instant invention contain a frothing agent in addition to a blowing agent. When used, the frothing agent is selected from the group consisting of $CHClF_2$, $CH_3CClF_2$, $CHClFCF_3$, $CH_3CF_3$, $CH_2F_2$, $CHF_2CF_3$, $CF_3CH_2F$, $CH_3CHF_2$, ordinary hydrocarbons, and other chemical compounds with boiling points between about $-52°$ C. and about $+10°$ C., which are inert to the reactive foam forming chemicals. This group includes both HCFCs and HFCs. The preferred frothing agents have molecular weights below 120, and the most preferred frothing agents have molecular weights below 100.

When higher boiling point blowing agents are utilized in the present invention, a frothing agent need not be necessarily employed. The preferred HCFC blowing agent is HCFC-141b because, for one reason, it requires less weight percentage added than does CFC-11. This occurs because the amount of blowing potential is a function of the molecular weight of the compound. The lower the molecular weight, the more molecules there are per pound of material; therefore, more blowing potential exists in lower molecular weight blowing agents. The prior art compound CFC-11 has a molecular weight of 137.4, while HCFC-141b has a 117.0 molecular weight. In planning to replace CFC-11 with HCFC-141b, the amount of HCFC-141b to use must be reduced to 85.15% (117/137.4) of the previous CFC-11 weight.

A major advantage of using a low molecular weight frothing agent is likewise the reduction in amount needed. The frothing agent, HCFC-22, has a molecular weight of 86.5. When using HCFC-22 in place of CFC-11, the theoretical weight reduction would be 86.5/137.4, or about 63% of the CFC-11 needed. However, due to the rapid evaporation of HCFC-22, which causes the potentially harmful cooling effect, the rate actually needed is from about 75% to about 80% of the prior art CFC-11 addition rate.

Some examples of frothing and blowing agents include, but are not limited to, those shown in Table 1.

TABLE 1

| Product | Formula | M.W. | B.P., °F. | Name |
|---|---|---|---|---|
| FROTHING AGENTS | | | | |
| 1. HCFC-22 | $CHClF_2$ | 86.5 | −41.4 | monochlorodifluoromethane |
| 2. HCFC-142b | $CH_3CClF_2$ | 100.5 | +14.4 | monochlorodifluoroethane |
| 3. HCFC-124 | $CHClFCF_3$ ethane | 136.5 | +12.2 | monochlorotetrafluoro- |
| 4. HFc-32 | $CH_2F_2$ | 52.0 | −60.9 | difluoromethane |
| 5. HFC-125 | $CHF_2CF_3$ | 120.0 | −55.3 | pentafluoroethane |
| 6. HFC-143a | $CH_3CF_3$ | 84.0 | −53.7 | trifluoroethane |
| 7. HFc-134a | $CF_3CH_2F$ | 102.0 | −15.7 | tetrafluoroethane |
| 8. HFC-152a | $CH_3CHF_2$ | 66.0 | −12.5 | difluoroethane |

TABLE 1-continued

| Product | Formula | M.W. | B.P., °F. | Name |
|---|---|---|---|---|
| BLOWING AGENTS | | | | |
| 1. HCFC-141b | $CClFCH_3$ | 117.0 | +89.6 | dichloromonofluoroethane |
| 2. HCFC-123 | $CF_3CHCl_2$ | 152.9 | +82.2 | dichlorotrifluoroethane |
| 3. HFC-245ca | $CF_2HCF_2CFH_2$ | 134.03 | +77.2 | pentafluoropropane |
| 4. HFC-356 | $CF_3CH_2CH_2CF_3$ | 166.04 | <+80.0 | hexafluorobutane |

As mentioned above, novel azeotropic blowing agents are disclosed in U.S. Pat. Nos. 5,166,182 and are incorporated herein by reference. Those novel azeotropic blowing agents, as well as the individual chemical compounds named in the azeotropes, are also suitable for use with the present invention.

Any prior art polyester polyol may be used in the polyurethane modified polyisocyanurate rigid foam of this invention; however, a low viscosity prior art polyol with a high degree of miscibility with CFC-11 must be mixed with a high viscosity polyol, or a poorly miscibla polyol, in order to be usable in the methods of this invention.

The preferred polyester polyols used in connection with the present invention have viscosity and solubility characteristics which produce blend viscosities between about 250 cps and about 1500 cps; and most preferably between about 400 cps and about 1000 cps at the temperature used in manufacturing. The temperatures used in manufacturing are above those prior art temperatures, which were maintained below the boiling point of CFC-11, or below about 75° F. The preferred polyester polyols also have a hydroxyl number between about 150 and about 300, and an average functionality between about 1.9 and about 3.0.

As it turns out, when HCFC-141b is added to almost any prior art polyol at a rate of 85% of the CFC-11 amount, the resulting viscosity of the blend is lower than it was using 100% CFC-11. In fact, in certain polyols, even when reducing the HCFC-141b level another 25% below the 85% of CFC-11 level, the resulting viscosity can be lower than it was with 100% CFC-11. The reason the amount of HCFC is reduced an additional 25% is in order to make room for the $CO_2$ blowing from the reaction of water and PMDI.

It has been found advantageous when using higher boiling point HCFCs to maintain chemical temperatures higher than they were with CFC-11, which was below 75° F. As mentioned earlier, 2-carbon HCFCs with many prior art polyols will produce B-Blends with viscosities too low for good cell formation, especially if used at temperatures higher than 75° F. It is necessary under all conditions to keep the blend viscosity in the optimum range. Therefore, a double dilemma is faced by the need to run high boiling point HCFCs at higher temperatures, plus the fact that the HCFCs create a B-Blend viscosity which is already too low. This invention teaches three ways to compensate: (1) The use of high viscosity PMDI, or alternatively, prepolymers of PMDI having a viscosity in excess of 2000 cps at 75° F.; and, (2) The use of polyols which are less compatible with HCFCs, or are more viscous on their own, or are some of both; and, (3) The use of the frothing agent technique which produces a higher "apparent viscosity" due to the instantaneous microcellularization of cells. However, the use of a frothing agent can likewise lead to cell wall rupture as described herein. This problem may also be alleviated by the use of more viscous Blends.

Some of the polyols for this invention are commercially available, but have not been generally used as the major component in the B-Blend for polyurethane modified polyisocyanurate foam. Some examples include, but are not limited to, Terate 203, Terate 253, Terate 2541, and Terate 2142 as sold by Cape Industries, Wilmington, N.C.; and Stepanpol PS-2402, Stepanpol PS-2002, and Stepanpol PS-2352 as sold by Stepan Chemical Company, Northfield, Ill. Processes of some modes of this invention specifically use the high boiling point HCFCs with higher viscosity polyester polyols, or less compatible polyester polyols, or those polyols being both, and use them at temperatures above the boiling point of CFC-11; e.g., above 75° F.; and still maintain a suitable B-Blend viscosity. Likewise, processes of some modes of this invention specifically utilize polyols with unusually high viscosities with frothing agents in order to maintain better cell wall integrity.

The tertiary amine catalysts of this invention must have at least two hydrogen bonding sites for one water molecule, wherein both segments of water; e.g. 1) the hydrogen; and, 2) the hydroxyl, are attracted by both hydrogen bonding sites essentially simultaneously. U.S. patent application Ser. No. 07/720,735 teaches the advantage of having an ethylene linkage ($-CH_2-CH_2-$) in a linear geometry between two heteroatoms. The advantage being that a combination of proper geometry (essentially linear), the proper length ($-CH_2-CH_2-$), and the strong attraction of heteroatoms (Nitrogen and Oxygen) make an ideal place for one water molecule to become attached. Both ether-oxygens and tertiary amine sites are strong hydrogen bonding sites. For purposes of definition, all the tertiary nitrogen atoms and the ether-oxygen atoms of these compounds shall be referred to herein as "Heteroatoms." Both segments of water become attached to each of 2 heteroatoms of the tertiary amine. Another class of tertiary amines having reasonably good hydrogen bonding sites for water, are those having two or more heteroatoms in a favorable geometry and at a favorable distance. Examples of this class are: Hexa-Hydro-1,3,5-Tris(3-Dimethylaminopropyl) Triazine (Pel-Cat 9640 from Ele Company or Polycat 41 from Air Products) and, 2,4,6-Tris(Dimethylaminomethyl)Phenol (Pel-Cat 9529 from Ele or TMR-30 from Air Products Company). While the location of heteroatoms is not ideal, these molecules offer hydrogen bonding attraction to both segments of water essentially simultaneously.

It has now been discovered that the unworkable tertiary catalysts are those which are either sterically hindered from hydrogen bonding both segments of water, or have a single heteroatom per molecule. An example of sterically hindered heteroatoms is present in Triethylene Diamine (TEDA). It is true the heteroatoms are ideally distanced apart by ethylene linkages; however, a single water molecule cannot be attracted at both of its segments due to the geometric isolation of the heteroatoms. Likewise, a single heteroatom per tertiary amine molecule cannot attract both segments of water essentially simultaneously. One example of a tertiary amine catalyst having one heteroatom per molecule is N,N-Dimethylcyclohexylamine (Air Product's Polycat 8). Other examples are the various dimethyl-, and diethyl-ethanolamines, such as dimethylethanolamine. These classes of catalysts promote the urethane reaction in preference to the $CO_2$ reaction, thus defeating the objects of this invention.

In prior art, Dabco BL-19 has been used by the flexible foam industry to catalyze the reaction of TDI (Toluene Di-Isocyanate) with water. In a paper by N. Malwitz, P. A. Manis, S. -W. Wong, and K. C. Frisch, entitled "Amine Catalysis of Polyurethane Foams", given at the 30th ANNUAL POLYURETHANE CONFERENCE, Oct. 15-17, 1986, this class of tertiary amine catalysts was shown to have a preferential activity for the water-PMDI reaction. The flexible foam manufacturers have used $CO_2$ to blow this open celled foam for many years. The water-TDI reaction catalyzed by these selective catalysts can produce $CO_2$ rapidly enough to cause cell wall rupture, which is desirable in flexible foam but not rigid insulating foam. The flexible foam manufacturers generally use $CO_2$ for over 50% of the blowing expansion incorporated. Thus it can be seen that rapid expansion in any form can be harmful to the production of closed-cell rigid foam for insulation.

When a catalyst from the most preferred class is mixed in a B-Blend with water added, the ethyl linkage between two heteroatoms is just the right length to assure that a water molecule will be advantageously fitted there; and thus the water will be the first reaction with PMDI when the A-Blend mixing is effected.

Examples of the most preferred catalysts include: Pentamethyldiethylenetriamine (Polycat-5) and Bis(2-dimethylaminoethyl)ether (Dabco BL-19). Pentamethyldiethylenetriamine (Polycat-5) has the structure:

$(CH_3)_2=N-CH_2-Ch_2-N(CH_3)-CH_2-CH_2-N=(CH_3)_2,$ while the structure $(CH_3)_2=N-CH_2-CH_2-O-CH_2-CH_2-N=(CH_3)_2,$ defines bis(2-dimethylaminoethyl)ether (Dabco BL-19).

These strong amines can initiate the reaction of isocyanate groups with the hydroxyl functional groups of the polyols; however, as long as they have water molecules attached to them by hydrogen bonding, the urethane reaction will be subordinated to the reaction between water and isocyanate.

The organo-salt catalyst of the present invention can be any form of alkali metallic cation dissolved in a solution with an organic anion. The preferred alkali metallic cation is potassium, however, the sodium cation is workable. The preferred potassium organo-salt catalyst used in the present invention is potassium acetate in a water solution. Since this invention requires the use of water, it has been found advantageous to eliminate the glycol solvents found in commercially prepared catalysts.

Potassium acetate at a concentration of 63% in water, without ethylene- or diethylene-glycol being present, provides an expansion-versus-chemical reaction profile better than other forms of a potassium organo-salt.

This invention is distinguished by the deliberate absence of a typical urethane-linkage-promoting catalyst. It relies upon a "water-isocyanate-$CO_2$ blowing" catalyst and a trimerization catalyst, but no urethane linkage catalyst is added in any mode of this invention. The most preferred processes of this invention rely upon the alkali metal organo-salt catalyst to initiate the urethane polymerization reaction. The alkali metal organo-salt catalyst offers more delay time prior to starting the urethane reaction than an ordinary urethane tertiary amine catalyst. The most preferred B-Blends are those having a tertiary amine catalyst with an ethylene linkage between two heteroatoms which are covered with adequate water molecules. This immediately produces $CO_2$ and makes it virtually impossible for the chemical reactions degree of completion to overcome the foam expansion degree of completion.

Prepared potassium organo-salt catalysts are commercially available as Dabco K-15, Polycat 46, Hexchem 977, and PEL-CAT 9540A. A unique feature of the present invention is that the organo-salt catalysts are utilized in amounts which insure that the exothermic reactions will proceed rapidly as well as reaching temperatures in excess of 275° F. Both the urethane reaction as well as the trimerization reaction must be well driven by the highest exothermic heat energy possible when utilizing either high boiling point blowing agents, or frothing agents which cool the chemicals, or utilizing both together.

Both water (for $CO_2$ blowing), and a potassium organo-salt catalyst are important components of the present invention; therefore they may be added as a preblended mixture of water, potassium hydroxide, and a carboxylic acid such as 2-ethyl-hexanoic acid or acidic acid. Likewise, a mixture of water with potassium acetate salt can be made up to 63% solids, and used as the main source of both water and potassium catalyst. In the currently most preferred embodiments a catalyst package comprised of potassium hydroxide, water, and acidic acid replaces the required organo-potassium catalyst portion of the B-Blend. The reason this is the currently most preferred embodiment is that it eliminates low equivalent weight glycols which are included with commercially prepared catalysts. The preblended mixture of potassium hydroxide and acidic acid is thus slightly preferred over potassium hydroxide and 2-ethyl-hexanoic acid since, with acidic acid, a higher weight percent of potassium ions can be placed in solution.

All B-Blends of the instant invention contain some active hydrogen compound such as water or an organic acid. The theoretical minimum amount of such compound required is defined as the minimum amount needed to provide one molecule of $CO_2$. Obviously, one hydrogen ion would suffice. However, in real life, the amount of active hydrogen needed is much higher than that. The amount to be included depends on the amount of $CO_2$ to be produced. Say, for example, a minimum amount of expansion agent gas volume replacement of 5% had been established. In order to produce enough $CO_2$ to substitute for or replace about 5% (on a gas volume basis) of a conventional blowing agent (such as HCFC-141b) in a low density (sheathing) foam with a 2.1 "Index", about 0.37 pphp of water is included. (The contraction "1.0 pphp" means "one part per hundred parts polyol". In the B-Blend, the term "parts" refers to the polyol.)

Depending on the Index and density of the foam, from about 0.35 to 2.5 pphp of water is included for up to about a 25% gas volume replacement. Over 3.0 pphp of water may be included for a higher Index foam using about 40% gas volume replacement.

In order to effectively complete a trimerization reaction, it is essential to reach an exotherm temperature in excess of 275° F. for the foams of the present invention. Thus, all foams of the instant invention produce an exothermic temperature in excess of 275° F. as measured in a free-rise box-pour of at least 250 grams total weight. The mass of the sample, location of the thermocouple, and the ambient conditions have a large effect of the exothermic temperatures recorded. The cooling effect of a prior art foam utilizing CFC-12 as an evaporating frothing agent has been reported to have reduced the exotherm temperature to below 275° F.

When using HCFC-22 in the B-Blend, most polyester polyols hydrogen bond with HCFC-22. This hydrogen bonding keeps the vapor pressure of the B-Blend low. B-Blends using low levels of HCFC-22, generally below 15% by weight, have normal operating pressures. When using HCFC-22 in the A-Blend, normally only about 5% by weight can be added and maintain normal operating pressures. However, it has been discovered that by adding propylene carbonate to either the A-Blend or the B-Blend, or both, the amount of HCFC-22 can be greatly increased without raising the vapor pressure. Furthermore, a prepolymer of PMDI and a 2 functional polyester diol can be made to have a viscosity of from 5,000 to 10,000 cps at 75° F., which when blended with up to 10% propylene carbonate, will hold well in excess of 5% HCFC-22 by weight without raising the vapor pressure; and, will conveniently maintain the ideal viscosity and temperature ranges. The use of high pressure mixing equipment is not necessary for blends, but must be used where the HCFC-22 is stored, weighed and added into the B-Blend.

It is possible to add both HCFC-22 and a fluorocarbon blowing agent to the same blend. However, adding more fluorocarbon will tend to force the HCFC-22 out of solution. In utilizing other fluorinated products, they have the same effect as adding more HCFC-22 by taking up the hydrogen bonding sites on the organic compounds. Thus, the combination of HCFC-22 and fluorocarbon blowing agent becomes the same maximum amount of pure HCFC-22 which is possible to add.

In one embodiment of the present invention, the HCFC-22 frothing agent is added to the B-Blend, and HCFC-141b is added to the A-Blend. In another embodiment, the HCFC-22 frothing agent is added to the A-Blend, and HCFC-141b is added to a more viscous, less compatible polyester polyol, such as Stepanpol 2402. In another preferred embodiment, both HCFC-22 and HCFC-141b are added to the B-Blend, which may use any polyester polyol taught herein, or taken from the prior art and viscosity modified.

In accordance with one mode of the invention, a first (i.e., "A-Blend") of two foam forming blends is prepared using at least polymeric polymethylene polyphenylisocyanate. A second (i.e., "B-Blend") of two foam forming blends is prepared by mixing together at least one polyol; a first blowing agent; a minor amount of water; a tertiary amine catalyst having at least two hydrogen bonding sites for one water molecule, wherein both segments of water; e.g. 1) the hydrogen; and, 2) the hydroxyl, are attracted by both hydrogen bonding sites essentially simultaneously; and, an alkali metal organo-salt catalyst. The amount of alkali metal organo-salt catalyst mixed in the blend is sufficient to raise the exotherm above 275° F. in the resultant foam.

When the first and second foam forming blends (the A-Blend and the B-Blend, respectively) are mixed together, the tertiary amine quickly initiates a reaction of water with the polymeric polymethylene polyphenyl isocyanate but does not quickly initiate a reaction of polyol with the polymeric polymethylene polyphenylisocyanate. This water-PMDI reaction produces a second blowing agent (carbon dioxide, $CO_2$) which forms cells in the blends and expands the blends prior to a Gel Point occurring in the urethane polymerization reaction. Moreover, the water-PMDI reaction initiated by the tertiary amine catalyst produces exothermic heat sufficient to initiate boiling of the first blowing agent.

The method of the present invention produces $CO_2$ for the purpose of foam expansion in such a manner that the degree of completion of expansion quickly moves ahead of the degree of completion of the chemical reactions. The degree of completion of expansion is greater than the degree of completion of the chemical reactions substantially throughout the foam production process.

Inclusion of alkali metal organo-salt catalyst enables the mixture of blends to obtain an exothermic heat sufficient for further vaporizing the first blowing agent, including some relatively high boiling point blowing agents. The vaporization of the first blowing agent in turn forms further cells in the blends and further expands the blends whereby expansion of the mixed blends is substantially complete prior to completion of the polymerization and cross-linking reactions.

As mentioned above, it is important to have the many complex chemical reactions timed with the foam expansion. The terms "Cream", "Gel", and "String" have been used to describe stages of the chemical reactions leading up to the formation of "Firm Solid" isocyanurate foam. "Firm Solid" foam occurs when there is completion of a majority of three dimensional polymerization and cross-linking formation. Foam is said to be "Firm Solid" where it is solid enough that it does not visibly move upon external application of a vibratory force.

"Cream Time", usually contracted to "Cream", means the length of time (in seconds after mixing is started) that is required before any activity is noted in the liquid chemical mixture of A- and B-Blends. Usually, the first activity noticed is the expansion. When a frothing agent is utilized in a pressurized foam machine, there is essentially no delay before expansion begins. However, at low levels of frothing agent addition, the initialization of $CO_2$ expansion can be detected.

The "Gel Point", or just "Gel", means the length of time that is required before the chemical reactions cause the material to show the first sign of losing pure liquid characteristics, and to show the first sign of semi-solid properties. In actual practice, the expanding foam is sliced with the thin edge of a wooden, medical tongue depressor once every second to see if the slice immediately closes on itself (still liquid) or if the sliced plane remains separated (semi-solid).

The "String Point", or "String", means the length of time required for the urethane polymerization and some isocyanurate cross-linking reactions to proceed far enough that the same wooden tongue depressor will "pull" a "string of material" from the surface of it. In actual practice, the flat side of the wooden depressor is placed against the expanding foam once every second, and quickly pulled away. The String Point is the point at which the material will stick to the wood, and will leave a trail of string(s) behind it as it is quickly pulled away. The foam is able to continue expanding beyond the String stage, but with increasing difficulty. It is advantageous to effect as much closed cell expansion as possible before the "Firm Solid" stage is reached.

FIGS. 1, 2, 3, and 4 generally represent important relationships between the degree of completion of expansion and the degree of completion of chemical reactions such as polymerization and cross-linking. FIGS. 1-4 show two dimensional graphs of curves which plot time on the "x" (horizontal) axis and either the "expansion" event or the "chemical reactions" event on the "y" (vertical) axis. Each of these concurrent "events" are, at any given point in time, in one stage or another of completion (from start to finish). The degree of completion has been depicted by the vertical axis shown in logarithmic increments from zero (0) stage of completion to 100% stage of completion. The degree of completion is defined as a point on the "y" ordinate. The actual "rate" is defined as the slope of the curve at any given point on the curve. These curves indicate that in the early stages (first 30 seconds) of either event, the "rate" of completion is quite rapid; i.e., the slope is steep. However, in the second 30 seconds, the slope becomes more gradual. Thus, for the second 30 seconds, in all examples of foam expansion and thermosetting chemical reactions of this invention, the rate decreases smoothly (or, "the event decelerates smoothly").

Figure 1:
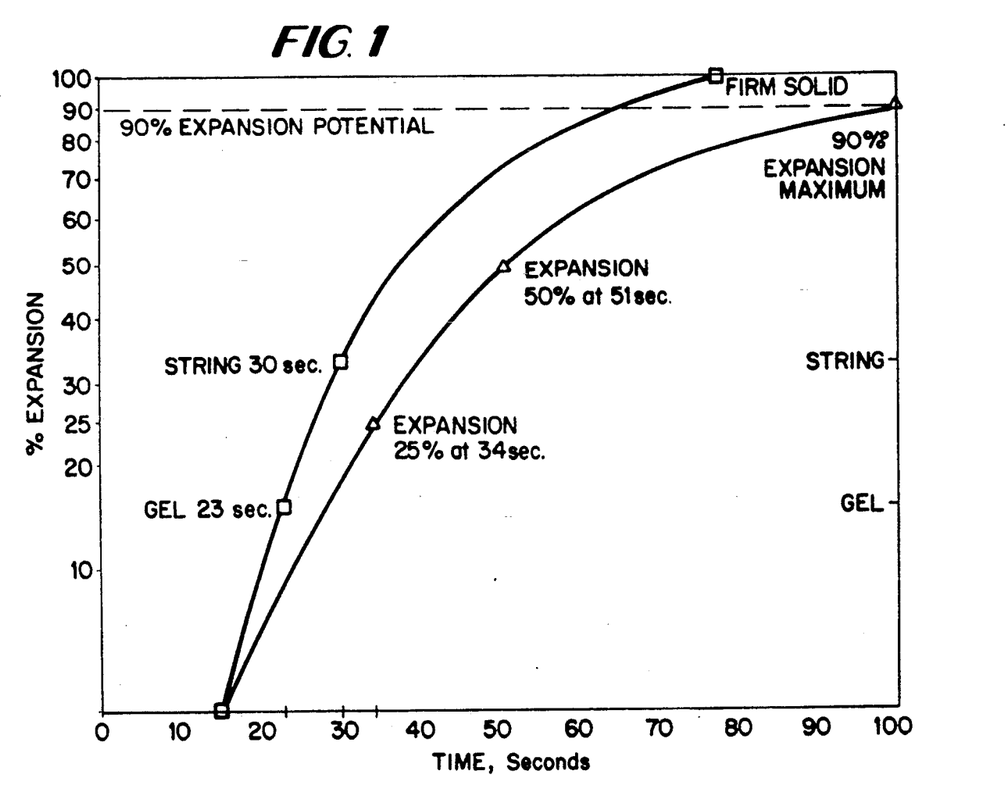
FIG. 1 is a graph showing foam production having a degree of completion of polymerization which is too fast for the degree of completion of expansion.

FIG. 1 depicts an expansion/chemical reactions relationship which is not acceptable because the chemical reaction degree of completion is so fast, or the expansion degree of completion so slow, or some of each, that a firm solid becomes formed before the expansion can reach its full potential. The conditions depicted by FIG. 1 create a foam density which is too high for good insulating properties.

Figure 2:
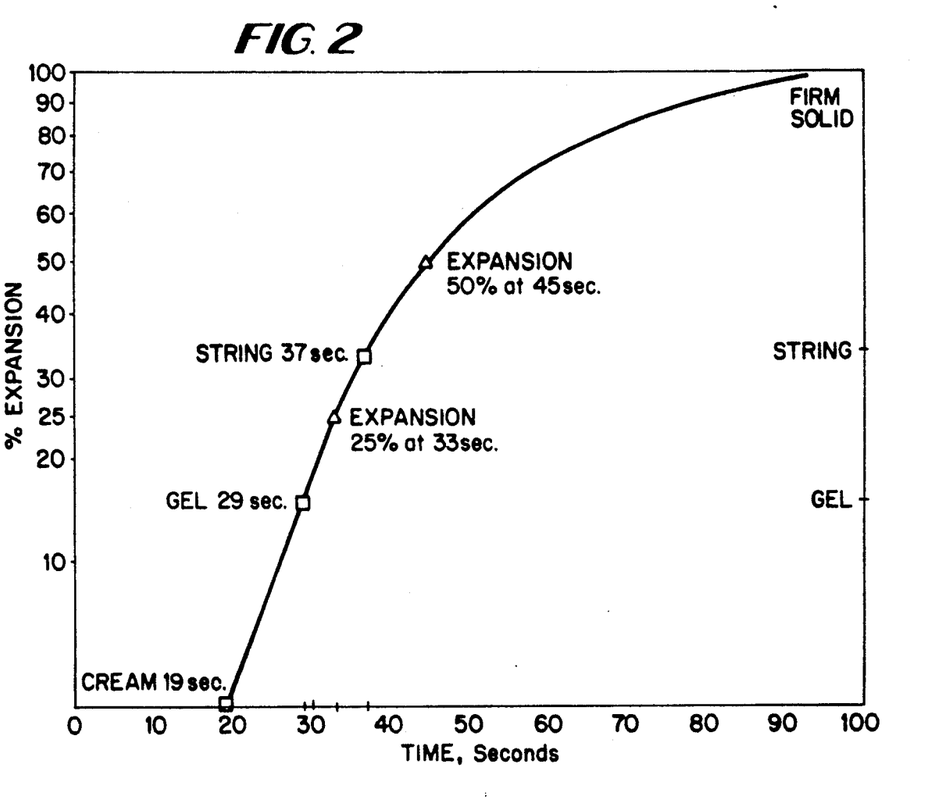
FIG. 2 is a graph showing timing relationships for prior art foam production utilizing CFC-11.

FIG. 2 depicts the normal prior art timing relationship whereby the degree of completion of expansion and the degree of completion of curing both proceed together.

Figure 3:
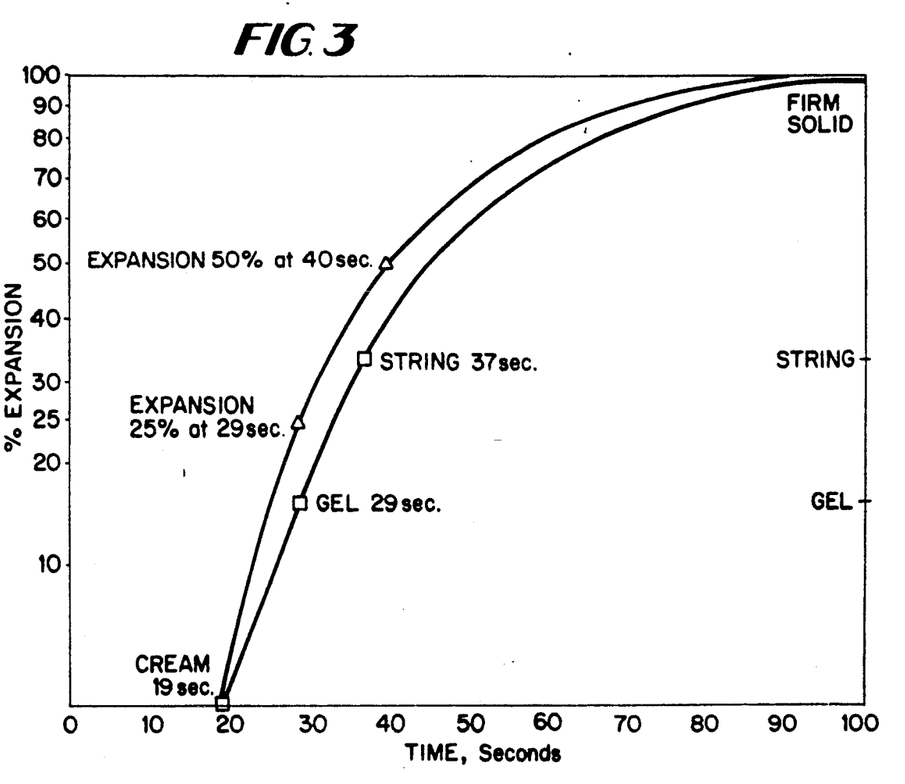
FIG. 3 is a graph showing degrees of completion for foam chemical reactions and foam expansion for a process according to a mode of the invention.

FIG. 3 represents an improvement of the present invention whereby the expansion degree of completion is ahead of the chemical reaction degree of completion. This method of producing $CO_2$ expansion causes the degree of completion of expansion to quickly and permanently move ahead of the degree of completion of reactions. As long as the cell wall strength is maintained, this condition virtually assures that the closed cell foam reaches the maximum expansion potential available.

The importance of FIG. 3 as compared to FIGS. 1 and 2 is that the "expansion" curve has an earlier starting time. In addition, at any given point on the completion ("y") axis, the degree of expansion completion is ahead (in seconds) of the degree of chemical reaction completion.

Figure 4:
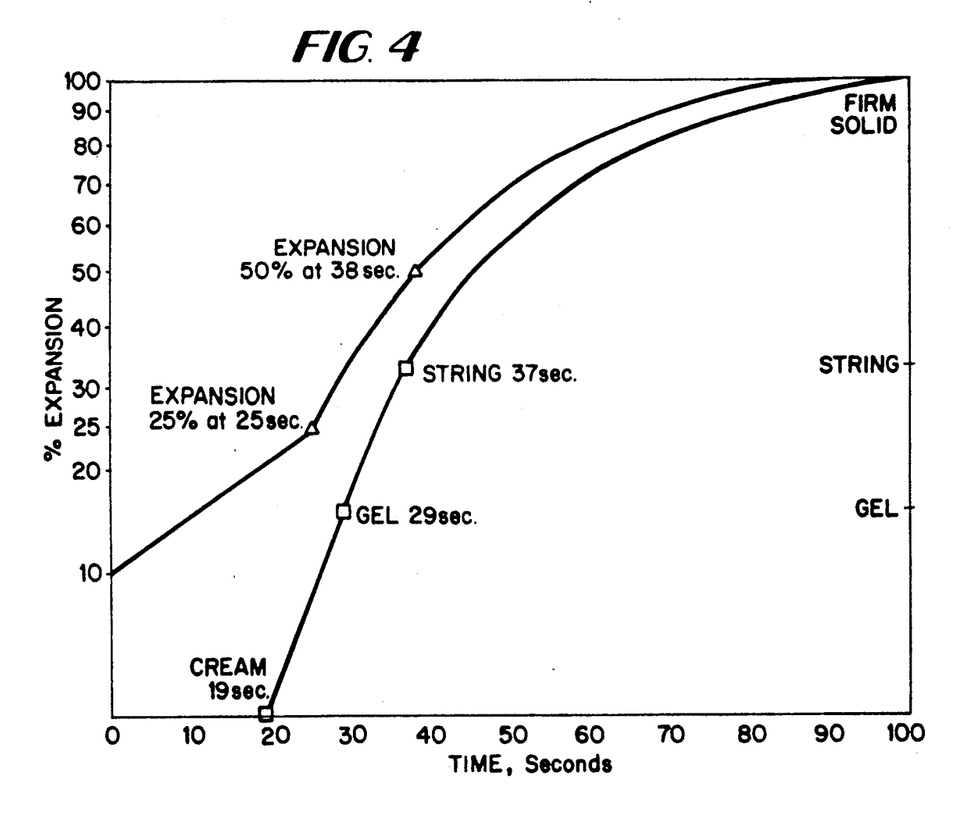
FIG. 4 is a graph showing degrees of completion for foam chemical reactions and foam expansion for a process according to a mode of the invention including a frothing agent.

FIG. 4 depicts the improvements noted in FIG. 3, with the additional improvement that the expansion degree of completion is enhanced with an additional permanent head-start over the chemical reaction degree of completion by the use of a frothing agent.

The method depicted in FIG. 3 by which the degree of foam expansion is caused to proceed ahead, and stay ahead, of the degree of chemical reactions is characterized as follows: (1) The early foam expansion is created by quickly forming $CO_2$ blowing agent without allowing many isocyanate groups to react with hydroxyl groups; (2) The smooth continuation of foam expansion by some vaporization of the blowing agent from the exothermic heat of the water-isocyanate reaction; (3) The continued expansion from boiling blowing agent from the exothermic heat of the chemical reactions being driven by a large amount of catalyst.

CHEMICAL BLENDS

Prior Art Viscosity Data

Those skilled in the art of producing high quality insulation foam with high-pressure impingment mixing equipment realize the viscosity at the point of mixing should be above about 250 cps for good cell structure, but below about 1000 cps to prevent pump cavitation. Most blends utilizing CFC-11 were maintained at about 60° F. to 65° F. prior to the high pressure pumps, and were therefore mixed at about 70° F. to 75° F. To illustrate the prior art viscosity data, Chemical Blend Example No. 1 is shown:

Chemical Blend Example No. 1

| CHEMICAL BLEND EXAMPLE NO. 1 | | |
|---|---|---|
| COMPONENT | Pbw | Weight % |
| Stepan 2502 | 100.00 | 28.10 |
| DC-5098 | 1.44 | 0.40 |
| K-15 | 6.11 | 1.72 |
| Polycat-5 | 0.20 | 0.06 |
| Water | 1.69 | 0.48 |
| Prop. Carb.* | 6.28 | 1.76 |
| CFC-11 | 39.72 | 11.16 |
| B-Blend Tot. | 155.44 | 43.68 |
| PAPI 580 | 190.00 | 53.39 |
| CFC-11 | 9.88 | 2.78 |
| DC-5098 | 0.56 | 0.16 |
| A-Blend Tot. | 200.44 | 56.32 |
| VISCOSITY, cps, Brookfield: | | |
| A-Blend At 75° F. = 395 cps | | |
| B-Blend At 75° F. = 355 cps | | |

*Prop. Carb. is abbreviation for propylene carbonate.

VISCOSITY ADJUSTMENTS UTILIZING VARIOUS CHEMICAL BLENDS

Prepolymer For A-Blend

As indicated in U.S. Pat. Nos. 4,791,148 and 4,888,365, a good quality foam can be made utilizing isocyanate-terminated quasi-prepolymers prepared from selected polyester polyols. As a means to increase the A-Blend viscosity to be useful in the methods of this invention, prepolymers were made as follows:

| Designation: | Grams Polyol Used: | Grams Iso. Used: | Average Viscosity at 75° F. |
|---|---|---|---|
| Prepolymer "A" | Polyol "A" = 48.75 g | 701.25 g M70 | 8500 cps |
| Prepolymer "B" | Polyol "B" = 48.75 g | 701.25 g M70 | 4700 cps |

As used above the "POLYMERIC ISOCYANANTE" is Lupranate M70 (Viscosity=760 cps@75° F.); the "POLYESTER POLYOL 'A'" is Stepanol PS-2402 (Viscosity=7080 cps@175° F.); and, the "POLYESTER POLYOL 'B'" is Stepan Agent 1609-57 (Viscosity=2400 cps@75° F.) Both polyester polyols have hydroxyl numbers of 240.

A-Blends From Isocyanates and Prepolymers

A-Blends utilizing 5 parts HCFC-141b by weight per 100 parts by weight isocyanate (parts per hundred parts; pphp) components were made, and gave the following viscosity results:

| Isocyanate Component | VISCOSITY, cps, Brookfield: | | | |
|---|---|---|---|---|
| | At 60° F. | At 65° F. | At 75° F. | At 80° F. |
| Prepolymer "A" | 4300 | 3350 | 1750 | 1350 |
| Prepolymer "B" | 3650 | 2675 | 1240 | 1160 |
| PAPI 18 (2400 cps @ 75° F.) | 1900 | 1500 | 840 | 670 |
| Lupranate M70 (760 cps; 75° F.) | 630 | 535 | 310 | 280 |

A-Blends From Isocyanates

A-Blend Examples Number 1 and 2

A-Blends utilizing different parts HCFC-141b by weight per 100 parts by weight isocyanate (parts per hundred parts; pphp) were made, and gave the following viscosity results:

| Isocyanate | Pphp | VISCOSITY, cps, Brookfield: | | |
|---|---|---|---|---|
| | | At 75° F. | At 80° F. | At 88° F. |
| 1. PAPI 18 | 4.0 | 1340 | 960 | 650 |
| 2. PAPI 18 | 5.5 | 830 | 660 | 490 |

B-Blends from Polyester Polyols

B-Blend Example Number 1

The Terate 2142 used for this example had a viscosity at 75° F. of 7,800 cps.

| COMPONENT | Pbw | Weight % |
|---|---|---|
| Terate 2142 | 100.00 | 78.17 |
| DC-5098 | 1.40 | 1.09 |
| K-15 | 4.20 | 3.28 |
| Polycat-46 | 0.60 | 0.47 |
| Polycat-5 | 0.20 | 0.16 |
| Water | 1.741 | 1.36 |
| HCFC-151b | 19.78 | 15.47 |
| B-Blend Tot. | 127.921 | 100.00 |

| Component | VISCOSITY, cps, Brookfield: | | |
|---|---|---|---|
| | At 75° F. | At 80° C. | At 88° F. |
| B-Blend | 875 | 730 | 500 |

B-Blend Example Number 2

The Stepan 2402 used for this example had a viscosity at 75° F. of 7,080 cps. When the A-Blend has more than 5 pphp by weight of the blowing agent, the B-Blend may contain as little as 13.18% by weight HCFC-141b, for example:

| COMPONENT | Pbw | Weight % |
|---|---|---|
| Stepan 2402 | 100.00 | 82.28 |
| DC-5098 | 1.40 | 1.15 |
| K-15 | 3.10 | 2.55 |
| Polycat-5 | 0.20 | 0.17 |
| Water | 0.813 | 0.67 |
| HCFC-141b | 16.02 | 13.18 |
| | 121.533 | 100.00 |

| VISCOSITY, cps, Brookfield: | | |
|---|---|---|
| At 65° F. | 75° C. | At 80° F. |
| 1480 | 890 | 700 |

B-Blend Example Number 3

The Stepanpol 2352 used for this example had a viscosity at 75° F. of 3,240 cps. In B-Blend Example Number 3, the 2.20 Pbw of KAT-25 used was a mixture of potassium hydroxide and acidic acid which produced the equivalent of a 63% potassium acetate salt (63% of 2.20=1.39) solution in water (37% of 2.2=0.81).

| COMPONENT | Pbw | Weight % |
|---|---|---|
| Stepan 2352 | 100.00 | 78.91 |
| DC-5098 | 2.40 | 1.89 |
| Polycat-5 | 0.25 | 0.20 |
| KAT-25** | 2.20 | 1.74 |
| Water Added | 0.84 | 0.67 |
| HCFC-145lb | 21.03 | 16.59 |
| | 126.72 | 100.00 |

| VISCOSITY, cps, Brookfield: | | |
|---|---|---|
| At 65° F. | 75° C. | At 80° F. |
| 1080 | 490 | 300 |

**Potassium = 1.39; and Water = 0.81

RIGID FOAM PRODUCTS

All foams of the present invention have physical properties well within the requirements of the Federal Specification HH-I-1972/GEN. Likewise, the thermal conductivity of some of the foams made with the HCFC-22 frothing agent and the HCFC-141b blowing agent appears to be about as good as the prior art foams made entirely with CFC-11. The intrinsic thermal resistance of HCFCs is not as good as the thermal resistance of CFC-11; however, the foam cell formation is greatly improved when frothing with HCFC-22. It is assumed that the smaller molecule, well distributed, has a nucleating effect which creates a very small, round, cell structure. This was referred to earlier as "microcellularization".

The foams of the present invention are all foams which have isocyanurate linkages in them; i.e., all foams proposed herein have a chemical equivalent ratio of polyisocyanate to polyol in excess of about 1.5:1.0.

The present invention is further illustrated by the following examples in which all parts and percentages are by weight unless otherwise indicated. The Foam Examples No. 1 through No. 5B show the use of prior art polyols at low, prior art temperatures, but with the new catalyst system of this invention. Foam Examples No. 6 through 10 use more viscous and less miscible polyols according to the invention, as well as higher blend temperatures and the unique catalyst system of this invention.

Foam Example No. 1

Figure 5:
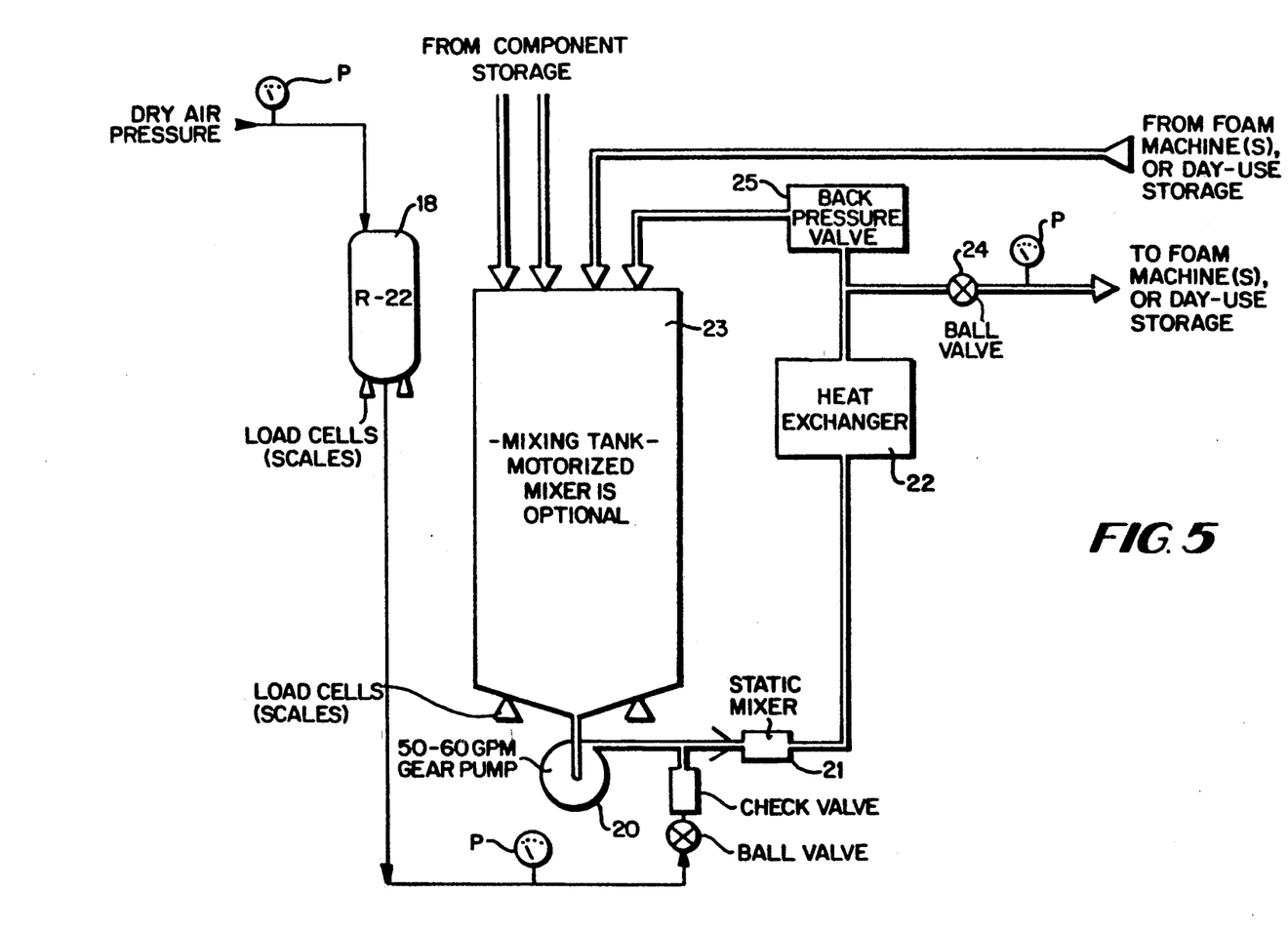
FIG. 5 is a schematic view of apparatus for foam production in accordance with a mode of the invention in which a frothing agent is included.

A high pressure impingement mixing machine was used for the foam examples. HCFC-22 was added in accordance with the apparatus shown in FIG. 5. FIG. 5 shows that liquid HCFC-22 (also known as "R-22") was fed from a tank 18 to a downstream side of a large gear pump 20. The gear pump 20 was used to pump the B-blend. From the downstream side of the pump 20, the B-blend was pumped through a static mixer 21, through a heat exchanger 22, and (when ball valve 24 was closed) to a 250 gallon mixing tank 23. The outlet of tank 23 fed the intake of pump 20. When the ball valve 24 was opened, a back pressure valve 25 caused the mixture to be directed to the high pressure foam machines whereat the B-blend was mixed with the A-blend.

The tank and heat exchanger were rated at 150 psig pressure, but the pressure gauges never exceeded about 80 psig, which is the normal operating pressure used to feed Bosch high pressure foam machine pumps. As the mixture blended well, and was cooled by the heat exchanger, the pressure dropped even as the amount of HCFC-22 in the blend was increased. The pressure at 14.1% HCFC-22, and at about 65° F., was about 45 psig. Dry air pressure was added to the system to insure that the high pressure Bosch pumps would not become "starved" for liquid material.

The formulations and results of Foam Example No. 1 are provided below:

| Component | Pbw | Characteristics |
|---|---|---|
| Stepanpol 2502 | 100.00 | Equivalent "Index" = 2.4 |
| Pluracol 975 | 15.00 | Free Rise Density = 1.64 PCF |
| Surfactant | 3.00 | String at 70° F. = 21 secs. |
| Dabco K-15 | 7.50 | 1.5" Board Density = 1.8 PCF |
| Polycat-5 | 0.25 | Initial k-factor = 0.13 |
| Water | 2.25 | Laminator Temp. = 145° F. |
| HCFC-22 | 21.00 | |
| TOTAL B-Blend | 149.00 | |
| PMDI | 273.50 | |
| CFC-11 | 24.00 | |
| DC-5098 | 1.00 | |
| TOTAL A-Blend | 298.50 | |

Foam Example No. 2

Using a typical laboratory high pressure foam machine, following the same blending procedure for HCFC-22 as taught in the production trial of Example 1, the following foam was made with the indicated results:

| Component | Pbw | Characteristics |
|---|---|---|
| Stepanpol 2502 | 100.00 | Equivalent "Index" = 2.2 |
| P. E. Glycol 400 | 10.00 | Free Rise Density = 1.75 PCF |
| Surfactant | 3.00 | String at 70° F. = 19 secs. |
| Dabco K-15 | 6.00 | Closed Box Density = 2.09 PCF |
| Polycat-5 | 0.20 | Dimensional Stability Tests: |
| Water | 1.43 | 158° F. & 97% RH, 24 Hours: |
| HCFC-22 | 17.50 | % Volume Change = +0.723% |
| TOTAL B-Blend | 138.13 | −40° F., 24 Hours: |
| PMDI | 194.00 | % Volume Change = −0.419% |
| CFC-11 | 16.10 | |
| DC-5098 | 1.00 | |
| TOTAL A-Blend | 211.10 | |

Foam Example No. 3

This example shows an early attempt at using HCFC-141b in place of CFC-11. The blowing efficiency was better than expected, thus the free rise density was too low. It used the same laboratory high pressure foam machine, and the same blending procedure for HCFC-22 as in Examples 1 and 2:

| Component | Pbw | Characteristics |
|---|---|---|
| Stepanpol 2502 | 100.00 | Equivalent "Index" = 2.2 |
| Pluracol 975 | 10.00 | Free Rise Density = 1.36 PCF |
| Surfactant | 3.00 | String at 75° F. = 23 secs. |
| Dabco K-15 | 7.00 | Closed Box Density = |
| Polycat-5 | 0.30 | Abandoned |
| Water | 2.21 | Initial k-factor = |
| HCFC-22 | 20.00 | Abandoned due to low |
| TOTAL B-Blend | 142.51 | free rise density |
| PMDI | 240.00 | |
| HCFC-141b | 20.80 | |
| DC-5098 | 1.00 | |
| TOTAL A-Blend | 261.80 | |

Foam Example No. 4

This example shows the first attempt to increase the density of the foam from Example 3. Both the blowing agents, $CO_2$ and HCFC-141b, were reduced; as was the frothing agent. It used the same laboratory high pressure foam machine, and the same blending procedure for HCFC-22 as in prior examples:

| Component | Pbw | Characteristics |
|---|---|---|
| Stepanpol 2502 | 100.00 | Equivalent "Index" = 2.2 |
| Pluracol 975 | 10.00 | Free Rise Density = 1.40 PCF |
| Surfactant | 2.50 | String at 75° F. = 22 secs. |
| Dabco K-15 | 6.80 | Closed Box Densities = 1.60, |
| Polycat-5 | 0.28 | 1.82, & 2.04 |
| Water | 2.00 | |
| HCFC-22 | 18.30 | |
| TOTAL B-Blend | 139.88 | |
| PMDI | 231.00 | |
| HCFC-141b | 18.70 | |
| DC-5098 | 1.00 | |
| TOTAL A-Blend | 250.70 | |

Foam Examples Nos. 5A and 5B

These examples show two non-CFC-11 production run foams, made without a frothing agent. The same production equipment used in Example 1 was used for this run. These foams had poor green strength, which caused expansion for several hours, followed by severe board shrinkage. This dimensional excursion was so serious in many of the laminated boards that it caused the facer to tear loose. Also this foam has a coarse cell structure, giving it a marginal R-Value. While some of the better samples of these laminated foam boards eventually cured and demonstrated a respectable dimensional stability, their short-term lack of green strength makes this example commercially undesirable. The main trial runs were made with 100% HCFC-123 or 100% HCFC-141b as follows:

| Component | 5A | 5B |
|---|---|---|
| Polyester Polyol | 100.00 | 100.00 |
| Silicone Surfactant | 3.00 | 3.00 |
| Potassium Octoate | 3.11 | 2.76 |

-continued-

| Component | 5A | 5B |
|---|---|---|
| Amine Catalyst | 1.12 | 0.91 |
| HCFC-123 | 53.00 | — |
| Total: | 160.23 | 149.67 |
| PMDI | 188.00 | 185.00 |
| Total: | 348.23 | 334.67 |
| Index: | 3.0 | 3.0 |
| Cream, Seconds: | 15" | 17" |
| Gel, Seconds: | 19" | 24" |
| String, Seconds: | 25" | 34" |
| Tack Free, Seconds: | 44" | 45" |
| 100% Rise, Seconds: | 98" | 98" |
| Initial k: | 0.13 | 0.14 |

Foam Example No. 6

This example shows the frothing agent going into the A-Blend instead of B-Blend, with the HCFC-141b going into the B-Blend utilizing a polyester polyol which has poor miscibility with CFC-11, and is about 3 times more viscous than PS-25052. It used the same laboratory high pressure foam machine, and the same blending procedure for HCFC-22 as prior examples and was produced at 77° F. chemical temperature:

| Component | Pbw | Characteristics |
|---|---|---|
| Stepanpol 2402 | 100.00 | Equivalent "Index" = 2.4 |
| Surfactant | 3.00 | String at 77° F. = 16 sec |
| Dabco K-15 | 7.00 | Free Rise Densities = 1.49 |
| Polycat-5 | 0.30 | |
| Water | 1.75 | |
| HCFC-141b | 22.00 | |
| TOTAL B-Blend | 134.05 | |
| PMDI | 221.00 | |
| HCFC-22 | 8.84 | |
| DC-5098 | 1.00 | |
| TOTAL A-Blend | 230.84 | |

Foam Examples Nos. 7A, 7B, and 7C

These examples show some production run foams, made on the production equipment of Example 1 and Example 5. The foams of Examples Nos. 7A, 7B, and 7C utilized the higher exothermic heat taught in this invention for the implementation of excellent green strength, improved cell structure, better k-factors, and good dimensional stability developed within 24 hours of production. These chemical A-Blends and B-Blends were run at 77° F. as was Foam Example No. 6.

| Component | 7A | 7B | 7C |
|---|---|---|---|
| Stepanpol PS-2402 | 100.00 | 100.00 | — |
| Terate D-214 | — | — | 100.00 |
| Propylene Carbonate | 4.00 | 4.00 | 5.00 |
| Silicone Surfactant | 2.00 | 2.00 | 2.00 |
| Dabco K-15 | 4.60 | 3.10 | 3.30 |
| Polycat 5 | 0.51 | 0.15 | 0.18 |
| Water | 3.31 | 0.54 | 0.59 |
| HCFC-141b | 15.60 | 24.60 | 26.60 |
| Total B-Blend: | 130.02 | 134.39 | 137.67 |
| PMDI | 275.00 | 167.00 | 185.50 |
| HCFC-141b | 5.50 | 6.26 | 6.96 |
| DC-5098 | 1.00 | 0.75 | 0.83 |
| Total A-Blend: | 281.50 | 174.01 | 193.29 |
| Total Blends: | 411.52 | 308.40 | 330.96 |
| Index: | 2.4 | 2.4 | 2.4 |
| Cream, Secs: | 17" | 18" | 18" |
| Gel, Secs: | 29" | 26" | 25" |
| String, Secs: | 37" | 34" | 31" |
| Tack Free Secs: | 48" | 41" | 42" |

-continued

| Component | 7A | 7B | 7C |
|---|---|---|---|
| Max. Rise Secs: | 90" | 96" | 76" |
| Free Rise Density: | 1.73 | 1.75 | 1.76 |
| Initial k: | 0.130 | 0.127 | 0.133 |

Foam Examples Nos. 8A and 8B

The viscosity tests of the B-Blends of these examples were made without the HCFC-22 present; i.e., all other components were mixed and brought to the temperature indicated.

| | | | VISCOSITY OF TOTAL B-BLENDS Viscosity, cps, Brookfield: | | |
|---|---|---|---|---|---|
| Component | 8A | 8B | At 65° F. | At 75° F. | At 80° F. |
| Stepan 2352 | | 100.00 | 720 | 470 | 385 |
| Cape Terate 2541 | 100.00 | | 920 | 600 | 475 |
| DC-5098 | 1.40 | 1.40 | | | |
| Dabco K-15 | 3.00 | 3.00 | | | |
| Polycat 5 | 0.20 | 0.20 | | | |
| Water | 0.87 | 0.92 | | | |
| HCFC-141b | 17.72 | 19.33 | | | |
| HCFC-22 | 3.39 | 3.59 | | | |
| Total B-Blend | 126.58 | 128.44 | | | |
| PAPI 18 (2400 cps) | 184.93 | 201.74 | 1520 | 850 | 680 |
| HCFC-141b | 9.25 | 10.09 | | | |
| DC-5098 | 0.56 | 0.61 | | | |
| Total A-Blend | 194.74 | 212.44 | | | |

Thus both the A-Blend and the B-Blends have viscosities well over 250 cps@75° F.

| Index: | 2.5 | 2.7 |
|---|---|---|
| Cream, Seconds: | 15" | 17" |
| Gel, Seconds: | 19" | 24" |
| String, Seconds: | 25" | 34" |
| Tack Free, Seconds: | 44" | 45" |
| 100% Rise, Seconds: | 98" | 98" |
| Initial k; Hand Mix | 0.12 | 0.12 |

Foam Examples Nos. 9A, 9B, 9C and 9D

These examples show some production run foams, made on the production equipment of Example 1, Example 5, and Example 7, and were run with blend temperatures of from 77° F. to 80° F., and mix-head temperatures of from 86° F. to 89° F. The foams of these Examples utilized the higher exothermic heat taught in this invention for the implementation of excellent green strength, improved cell structure, better k-factors, and good dimensional stability developed within 24 hours of production.

| Component | 9A | 9B | 9C | 9D | 9E |
|---|---|---|---|---|---|
| Stepan 2352 | — | 100.00 | — | — | — |
| Stepan Agent X999-190 | — | — | — | 100.00 | 100.00 |
| Terate 2142 | — | — | 100.00 | — | — |
| Terate 2541 | 100.00 | — | — | — | — |
| DC-5098 Silicone | 1.40 | 1.40 | 1.40 | 1.40 | 1.40 |
| Dabco K-15 | 3.57 | 3.57 | 3.80 | 4.00 | 4.00 |
| Pel-Cat 9650 | 0.51 | 0.51 | 0.60 | 0.57 | 0.57 |
| Polycat 5 | 0.20 | 0.20 | 0.20 | 0.15 | 0.15 |
| Water | 1.72 | 1.86 | 1.74 | 1.86 | 1.78 |
| HCFC-141b | 22.06 | 23.44 | 22.24 | 23.44 | 21.75 |
| HCFC-22 | — | — | — | — | 2.20 |

-continued

| Component | 9A | 9B | 9C | 9D | 9E |
|---|---|---|---|---|---|
| Total A-Blend: | 252.88 | 282.41 | 257.21 | 282.41 | 283.87 |
| Reactivities At Mix Head: | | | | | |
| Temperature At Head: | 89° F. | 88° F. | 87° F. | 88° F. | 86° F. |
| Cream, Secs: | 10" | 11" | 11" | 11" | 11" |
| Gel, Secs: | 20" | 19" | 18" | 19" | 19" |
| String, Secs: | 26" | 28" | 25" | 25" | 27" |
| Tack Free Secs: | 34" | 40" | 34" | 37" | 40" |
| Free Rise Density: | 1.72 | 1.75 | 1.76 | 1.77 | 1.53 |
| Initial k: | 0.130 | 0.127 | 0.133 | 0.126 | 0.125 |

Foam Example No. 10

In Foam Example Number 10, KAT-25 is as described in B-Blend Example Number 3.

| COMPONENT | Pbw | Weight % |
|---|---|---|
| Stepan 2352 | 100.00 | 28.11 |
| DC-5098 | 2.50 | 0.70 |
| Polycat-5 | 0.25 | 0.07 |
| KAT-25 | 2.20 | 0.62 |
| Water Added | 0.84 | 0.24 |
| HCFC-141b | 21.03 | 5.91 |
| | 126.82 | 35.65 |
| PMDI | 217.52 | 61.13 |
| HCFC-141b | 10.92 | 3.07 |
| DC-5098 | 0.53 | 0.15 |
| | 228.97 | 64.35 |
| TOTAL FOAM | 355.79 | |
| Reactivities at 77° F. | | |
| Index: | | 2.5 |
| Cream, Seconds | | 15" |
| Gel, Seconds | | 26" |
| String, Seconds | | 34" |
| Tack Free, Seconds | | 44" |
| 100% Rise, Seconds | | 94" |
| Initial k, Hand Mix | | 0.12 |
| Density | | 1.725 |

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of producing a rigid thermosetting foam, the method comprising the steps of:
    (1) preparing a first of two foam forming blends using polymeric polymethylene polyphenylisocyanate;
    (2) preparing a second of two foam forming blends by mixing together:
        (a) a polyol;
        (b) water in an amount less than 1% by weight of the total foam;
        (c) a tertiary amine catalyst having at least two hydrogen bonding sites for one water molecule, wherein both the hydrogen segment and the hydroxyl segment of water are attracted by both of the hydrogen bonding sites on the catalyst molecule essentially simultaneously;
        (d) an alkali metal organo-salt catalyst comprising a preblending of water, potassium hydroxide, and a carboxylic acid;
    (3) mixing a first blowing agent with one of the two foam forming blends;
    (4) mixing together the first and second foam forming blends whereby the following occurs:
        (a) the tertiary amine catalyst initiates a reaction between the water and the polymeric polymethylene polyphenylisocyanate whereby prior to a gel point of the
            i) a second blowing agent is produced for forming closed cells in the blends and for causing expansion in the liquid blends;
            ii) sufficient exothermic heat is produced to initiate boiling of the first blowing agent; followed by
        (b) the alkali metal organo-salt catalyst induces rapid vaporizing of the first blowing agent due to a high level of exothermic heat, whereby expansion of the mixed blends is substantially completed prior to the effective conversion of the mixed liquid blends to a rigid solid, the alkali metal organo-salt catalyst being present in an amount sufficient to cause a sufficiently complete trimerization reaction.

2. The method of claim 1 wherein the carboxylic acid is acidic acid.

3. The method of claim 1, wherein the carboxylic acid is 2-ethyl-hexanoic acid.

4. The method of claim 1, further comprising mixing a frothing agent with at least one of the two foam forming blends.

5. The method of claim 4, wherein the frothing agent is chosen from a group consisting of $CHClF_2$, $CH_3CClF_2$, $CHClFCF_3$, $CH_2F_2$, $CHF_2CF_3$, $CH_3CF_3$, $CF_3CH_2F$, and $CH_3CHF_2$.

6. The method of claim 1, wherein the polymeric polymethylene polyphenylisocyanate has an average functionality greater than two.

7. The method of claim 1, wherein the tertiary amine catalyst is chosen from a group consisting of pentamethyldiethylenetriamine, bis(2-dimethylaminoethyl)ether, hexa-hydro-1,3,5tris(3-dimethylaminopropyl)triazine, and 2,4,6-tris(dimethylaminomethyl)phenol.

8. The method of claim 1, wherein the polyol is a polyester polyol having an average functionality between about 1.9 and 3.0.

9. A method of producing a rigid thermosetting foam, the method comprising the steps of:
    (1) preparing an alkali metal organo-salt catalyst by preblending water, potassium hydroxide, and a carboxylic acid;
    (2) preparing a first of two foam forming blends using polymeric polymethylene polyphenylisocyanate;
    (3) preparing a second of two foam forming blends by mixing together:
        (a) a polyol;
        (b) water in an amount less than 1% by weight of the total foam;
        (c) a tertiary amine catalyst having at least two hydrogen bonding sites for one water molecule, wherein both the hydrogen segment and the hydroxyl segment of water are attracted by both of the hydrogen bonding sites on the catalyst molecule essentially simultaneously;
        (d) the alkali metal organo-salt catalyst of step (1);
    (4) mixing a first blowing agent with one of the two foam forming blends;
    (5) mixing together the first and second foam forming blends whereby the following occurs:
        (a) the tertiary amine catalyst initiates a reaction between the water and the polymeric polymethylene polyphenylisocyanate whereby prior to a gel point of the foam:
  i) a second blowing agent is produced for forming closed cells in the blends and for causing expansion in the liquid blends;
  ii) sufficient exothermic heat is produced to initiate boiling of the first blowing agent; followed by
(b) the alkali metal organo-salt catalyst induces rapid vaporizing of the first blowing agent due to a high level of exothermic heat, whereby expansion of the mixed blends is substantially completed prior to the effective conversion of the mixed liquid blends to a rigid solid, the alkali metal organo-salt catalyst being present in an amount sufficient to cause a sufficiently complete trimerization reaction.

10. The method of claim 9, wherein the carboxylic acid is acidic acid.

11. The method of claim 9, wherein the carboxylic acid is 2-ethyl-hexanoic acid.

12. The method of claim 9, further comprising mixing a frothing agent with at least one of the two foam forming blends.

13. The method of claim 4, wherein the frothing agent is chosen from a group consisting of $CHClF_2$, $CH_3CClF_2$, $CHClFCF_3$, $CH_2F_2$, $CHF_2CH_3$, $CH_3CF_3CF_3CH_2F$, and $CH_3CHF_2$.

14. The method of claim 9, wherein the polymeric polymethylene polyphenylisocyanate has an average functionality greater than two.

15. The method of claim 9, wherein the tertiary amine catalyst is chosen from a group consisting of pentamethyldiethylenetriamine, bis(2-dimethylaminoethyl)ether, hexa-hydro-1,3,5-tris (3-dimethylaminopropyl)-triazine, and 2,4,6-tris(dimethylaminomethyl)phenol.

16. The method of claim 9, wherein the first blowing agent is selected from a group consisting of $CCl_2FCH_3$, $CF_3CHCl_2$, $CF_2HCF_2CFH_2$, $CF_3CH_2CH_2CF_3$, and organic compounds having boiling points below about 50° C.

17. The method of claim 9, wherein the polyol is a polyester polyol having a hydroxyl number between about 150 and 300.

18. The method of claim 9, wherein the polyol is a polyester polyol having an average functionality between about 1.9 and 3.0.

19. The method of claim 1, wherein the polyol is a poloyester polyol having a hydroxyl number between about 150 and 300.

20. The method of claim 1, wherein the first blowing agent is selected from a group consisting of $CCl_2FCH_3$, $CF_3CHCl_2$, $CF_2HCF_2CFH_2$, $CF_3CH_2CH_2CF_3$, and organic compounds having boiling points below about 50° C.

* * * * *